FINE-GRAINED BICHROMATE SENSITIZED
PHOTOGRAPHIC MATERIAL
Filed July 9, 1948

WILLIAM H. GRIGGS
WILLIAM F. FOWLER, JR.
INVENTORS
BY Newton M. Perrins
W. H. McDowell
ATTORNEY & AGENT Patented Mar. 7, 1950

2,500,028

UNITED STATES PATENT OFFICE 2,500,028

FINE-GRAINED BICHROMATE SENSITIZED PHOTOGRAPHIC MATERIAL

William H. Griggs and William F. Fowler, Jr., Rochester, N. Y., assignors to Eastman Kodak Company, Rochester, N. Y., a corporation of New Jersey Application July 9, 1948, Serial No. 37,834

5 Claims. (Cl. 95—7)

Figures 1, 2, 3:
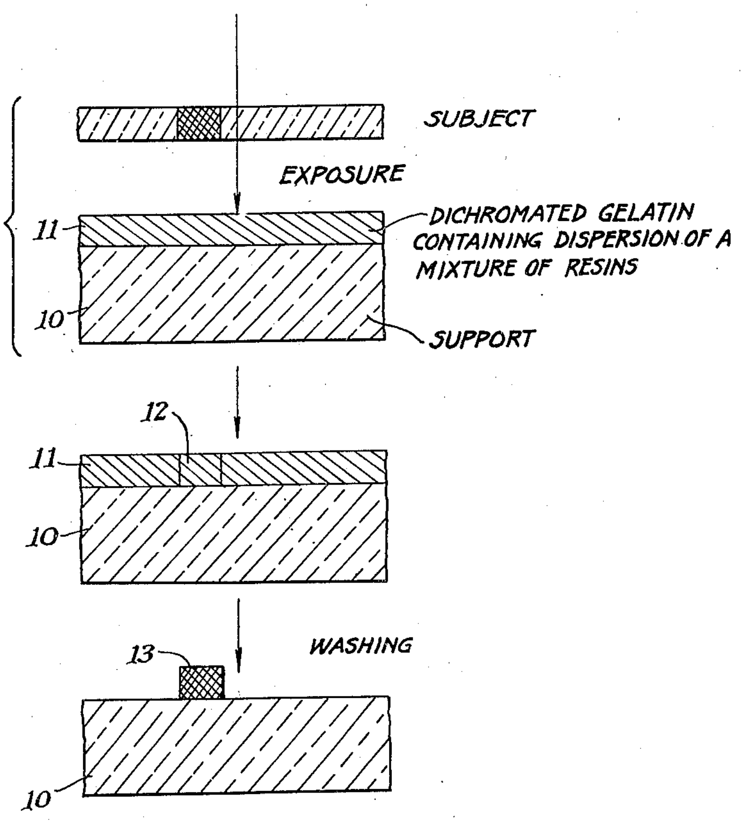

This invention relates to a photographic reproduction process and more particularly to a photographic process wherein reproductions are made by means of direct positive relief images.

In the Staehle patent application Serial No. 558,346, filed October 12, 1944, and the Griggs application Serial No. 37,833, filed concurrently herewith, now Patent No. 2,484,451, October 11, 1949, bichromated hydrophilic colloid-hydrophobic colloid systems are described which are capable of producing direct positive relief images by exposure to an image and washing away the exposed areas to leave a relief image in the unexposed portions. In such processes we have found that the sharpness of the resulting images is dependent upon how cleanly, during the washing step, the exposed areas of the photographic element break away from adjacent unexposed areas. Thus the resolving power of the sensitive compositions may be high or low depending upon certain physical and chemical properties of the sensitive compositions. In this connection we now find that if the degree of dispersion of the solid constituent of the sensitive compositions is high, the compositions possess high resolving power.

One object of our invention is to provide sensitive compositions capable of producing direct positive relief images of high resolving power. Another object is to provide a method of producing sharply defined direct positive relief images. Other objects will become apparent from the following description of our invention.

The objects of our invention are accomplished in part by providing a dichromated gelatin-water-insoluble acrylate resin system with a minor proportion of a polyvinyl ester resin which imparts fine-grained characteristics to the sensitive coating compositions and yields highly resolved relief image reproductions of a subject.

In the above co-pending patent applications, a number of water-insoluble synthetic resins are mentioned as useful in the dichromated colloid systems such as polyacrylate and polyvinyl acetate resins. The former resins are well suited for the production of relief images when the nature of the subject to be reproduced does not require a sensitive composition of high resolving power. That is, when a mixture of acrylate resin dispersion and gelatin, preferably containing pigment such as titanium dioxide, is compounded, when freshly made the mixture is grainy and not suitable for fine line reproduction work. Only after aging for some time are such compositions more satisfactory for fine line reproduction.

Polyvinyl acetate resin, however, is not as well suited for use in the processes together with gelatin, because of its poor inherent physical properties which result in poor adhesion of emulsions to the support and the fact that direct positive relief images produced therewith have very poor definition.

Quite unexpectedly we have discovered that contrary to what would be expected from the above behavior of polyvinyl ester resins, when a minor proportion of a polyvinyl ester particularly polyvinyl acetate is added to a bichromated gelatin-polyacrylate resin system, the grain or degree of dispersion of the components of the system is improved and excels the simple gelatin-acrylate resin system. This results in a great improvement in resolving power of the sensitive element. At the same time, other properties of the compositions are not adversely affected by the presence of the polyvinyl ester resin. The exact mechanism involved is not clearly understood. However, it appears that the aqueous dispersions of gelatin and acrylate resin tend to agglomerate, thereby increasing the graininess of the emulsion or decreasing the degree of colloidal dispersion of the solid components. When a polyvinyl ester is added it appears that the colloidal dispersion is stabilized and the tendency to agglomerate is reduced. Whatever the reason, the result is that our sensitive compositions possess remarkably improved resolving properties contrary to what might be expected from the behavior of the polyvinyl ester per se in such compositions. The improvement in resolving power which is obtained is of the order of 100 lines per square inch although this will vary somewhat with the manner and conditions of use.

In the accompanying drawings Figures 1 to 3 show in an enlarged cross-sectional view the appearance of a sensitive element produced according to our invention at various stages in the process of the production of relief images of improved definition.

Our invention may be understood by consideration of the following examples in reference to the accompanying drawings which examples are given as only illustrative and not exhaustive of various means of accomplishing the objects of our invention.

*Example 1*

Forty-five cc. of acrylate resin dispersion A and 20 cc. of a polyvinyl acetate resin dispersion B and 60 cc. of water, are mixed with a solution of 30 grams of gelatin dissolved in 100 cc. of water. This dispersion is then placed in a ball mill and 145 grams of titanium oxide and 60 cc. of water are added. The contents of the ball mill are ground for 24 hours following which 20 cc. of 20 per cent ammonium dichromate solution is added. The sensitive composition is then coated and dried on a suitable support such as a plasticized cellulose nitrate film support. The resulting sensitive photographic element would then appear substantially as shown in Fig. 1 of the accompanying drawings according to which support 10 carries the layer 11 of a mixture of bichromated gelatin and a colloidal dispersion of the acrylate and polyvinyl ester resins.

The acrylate resin dispersion A used above is prepared as follows: 3 grams of potassium persulfate and 54 cc. of a 30 per cent solution of trimethyl benzyl ammonium hydroxide in 262 cc. of distilled water is buffered with a sodium hydroxide and sodium dihydrogen phosphate to pH of 7. A mixture of 285 grams of ethyl acrylate and 15 grams of acrylonitrile is then added and the entire mixture run through a colloid mill. The emulsion is polymerized by heating on a steam bath in an all-glass apparatus for about one hour. The resulting dispersion is then cooled and filtered.

The polyvinyl acetate resin dispersion B used above is prepared as follows: 5 grams of potassium persulfate, 16.2 grams of the above alkaline detergent solution, 500 cc. of distilled water and 50 grams of vinyl acetate are mixed thoroughly and then heated under a reflex condenser with occasional stirring for about ten minutes. When the solution begins to appear milky, the addition of vinyl acetate is continued slowly with heating and stirring until a total of 500 grams has been added. The addition is carried out over a period of one hour. After cooling, the resultant dispersion is filtered. Other polyvinyl ester resin dispersions are prepared in a similar manner.

The sensitive photographic elements of our invention prepared as above described and appearing substantially as shown in Fig. 1 of the accompanying drawings, may be used for the production of direct position relief images in a very simple manner as described in the Staehle and Griggs applications mentioned herein. As shown in the accompanying drawings the sensitive element of Fig. 1 is exposed to a subject shown, the light source being a 35-ampere carbon arc lamp placed at about 18 inches distance and the exposure time being of the order of two to four minutes. After exposure the emulsion layer has been selectively hardened as shown in Fig. 2 of the drawings according to which the support 10 carries the emulsion layer 11 containing unhardened emulsion in area 12 while the balance of the layer has been hardened by the exposure to light. Following exposure to light, the element is washed with a stream of water or alkaline solution which removes the hardened area of the emulsion layer leaving the direct positive relief image 13 on support 10 as shown in Fig. 3 of the drawings. Relief image 13 is colored or not depending on whether the original emulsion layer 11 contained coloring matter or coloring matter is formed in the relief image after development.

In the above example a ratio of approximately 1:1 of gelatin and total resin was used and the ratio of polyvinyl ester to acrylate resin was approximately 1:3. If desired, the ratio of gelatin to resin may vary from about 0.5 to two parts gelatin per part resin by weight. The range preferred for optimum results is about 1.25 parts gelatin per part resin. When the proportion of the gelatin is increased to more than about two parts per part resin, the emulsion tends to become soft and water soluble with the result that the relief may turn out to be a negative rather than a positive compared to the original subject. On the other hand, the best results are obtainable by using a minor proportion of gelatin of no less than about 0.5 part per part resin. When the gelatin is decreased appreciably more, the emulsion assumes more the character of the resins, decreasing in sensitivity and the positive relief image is difficult to obtain. It is apparent that the range of ratios and the preferred ratio may vary somewhat with choice of the type of resin dispersion, the support or gelatin or hydrophobic colloids in use, but generally the range ratio of gelation to resin of from 2:1 to 0.5:1 is suitable for use in most of our hydrophilic colloid-resin dispersions. If the proper choice of ratio of hydrophilic colloid to resins has been made, the composition may be said to be adapted to producing direct positive relief images as above described.

A minor amount of polyvinyl ester resin such as polyvinyl acetate is used in the composition—that is, we find that a range of from about 10 to about 50 per cent as much polyvinyl acetate as there is acrylate resin in the emulsion is effective in stabilizing and improving the resolving power and grain characteristics of the composition, although this range may vary somewhat depending on materials used and conditions of operation. Similar amounts of another ester such as polyvinyl propionate or butyrate may be used.

Here and in the appended claims where we use the word "stable" we mean that the components of the emulsion coating compositions, by virtue of the addition of the secondary resin component, exists in a finely-divided colloidal state which is disturbed only by application of an abnormal force or condition not usually encountered by sensitive photographic materials such as abnormal conditions of heat, humidity and aging. Similarly, after coating such compositions the resultant sensitive elements retain the fine grain characteristics of the liquid compositions.

While gelatin is the preferred hydrophilic colloid used in our compositions, we may use instead in similar proportions gum arabic or polyvinyl alcohol. By "gelatin" as used herein and in the appended claims, we mean ordinary gelatin obtained from hides, bones and the like, especially partially hydrolyzed or limed gelatins, as well as gelatins or glues of fish origin such as common fish glue.

The composition of our invention may be coated or sprayed upon a variety of supports to provide sensitive photographic elements comprising a part of our invention. A number of supports having cellulose ester or resin surfaces, preferably plasticized, such a cellulose nitrate containing dibutyl phthalate; ethyl cellulose-pure phenolic resin mixtures containing tricresyl phosphate or if desired chlorinated biphenyl resin, or a surface of a mixture of ethyl cellulose, polyvinyl acetal resin and chlorinated biphenyl resin, are especially suitable. These plasticized materials are especially useful for priming from solvent solution any surface capable of being lacquered such as metal, wood, glass, rubber, concrete or other refractory materials. Supports such as cellulose acetate or acetate butyrate, polyvinyl butyral resin and polyacrylic ester resins generally require no priming prior to coating with our sensitive emulsions. Phenol-formaldehyde resin surfaces are generally too hard to sensitize without use of a priming coat. Similarly the adhesion of the emulsion to rubber is not good.

In place of the particular acrylate copolymer resin component used in the above example, we may use other water-insoluble resins forming colloidal dispersions in water such as polymethyl or polyethyl acrylate, polymethyl methacrylate, as well as polyvinylidene chloride, polystyrene, or natural and synthetic (neoprene) rubber latex. Other desirable characteristics of the resin are that it is soft, that is, aqueous dispersions of the resin do not dry to very hard films. This property can be controlled in part in a well known manner by regulating the degree of polymerization of the resin. The resin must also be water-insoluble and an aqueous colloidal dispersion alone must be capable of drying to a continuous film on glass.

The bichromated compositions of our invention may contain black or white pigments or dyes or the black relief image may be obtained as described in the above Griggs application by converting a lead salt in the relief image to lead sulfide. Similarly, our compositions and sensitive elements are useful in the decoration of ceramic ware as described in the co-pending Staehle application Ser. No. 745,737, filed May 3, 1947, now Patent No. 2,472,128 of June 7, 1949.

It will be understood that our invention is to be taken as limited only by the scope of the appended claims.

What we claim is:

1. A stable, light-sensitive coating composition comprising a mixture of bichromated gelatin and an aqueous colloidal dispersion of soft, water-insoluble polyethylacrylate and polyvinyl acetate resins, the latter resin being present in an amount from about 10 to about 50 per cent of the weight of said acrylate resin and the amount of gelatin in said composition being of the order of from about 0.5 to about 2 parts per resin.

2. A stable light-sensitive coating composition comprising a mixture of bichromated gelatin and an aqueous colloidal dispersion of soft, water-insoluble polyethylacrylate and polyvinyl acetate resins, the amount of the latter resin being about 33% of the amount of acrylate resin, and the gelatin being present to the extent of about 1.25 parts per part resin.

3. A light-sensitive photographic element comprising a support having thereon a layer of a mixture of bichromated gelatin and a dispersion of soft, water-insoluble polyethylacrylate and polyvinyl acetate resins, the latter resin being present in an amount from about 10 to about 50 per cent of the weight of said acrylate resin and the amount of gelatin in said composition being of the order of from 0.5 to 2 parts per part resin.

4. A light-sensitive photographic element comprising a support having thereon a layer of a mixture of bichromated gelatin and a dispersion of soft, water-insoluble polyethylacrylate and polyvinyl acetate resins, the amount of the latter resin being about 33% of the amount of acrylate resin, and the gelatin being present to the extent of about 1.25 parts per part resin.

5. The method of photographically producing a sharply defined direct positive relief image reproduction of a subject which comprises coating a support with a mixture of bichromated gelatin and an aqueous colloidal dispersion of soft, water-insoluble acrylate and polyvinyl ester resins, the latter resin being present in an amount from about 10 to about 50 percent of the weight of said acrylate resin, and the amount of gelatin being of the order of from 0.5 to 2 parts per part resin, exposing said element to a subject, and washing away the exposed regions of said coating, leaving a sharply defined image in the unexposed regions.

WILLIAM H. GRIGGS.
WILLIAM F. FOWLER, JR.

REFERENCES CITED

The following references are of record in the file of this patent:

UNITED STATES PATENTS

| Number | Name | Date |
|---|---|---|
| 1,981,102 | Hagedorn et al. | Nov. 20, 1934 |
| 2,184,310 | Meigs et al. | Dec. 26, 1939 |
| 2,376,005 | Potter | May 15, 1945 |

FOREIGN PATENTS

| Number | Country | Date |
|---|---|---|
| 573,771 | Great Britain | Dec. 5, 1945 |